(12) United States Patent
Callan et al.

(10) Patent No.: US 7,146,491 B2
(45) Date of Patent: Dec. 5, 2006

(54) APPARATUS AND METHOD FOR GENERATING CONSTANT VALUES

(75) Inventors: Jonathan Sean Callan, Cambridge (GB); David Hennah Mansell, Usk (GB); Christopher Pedley, Cambridge (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 241 days.

(21) Appl. No.: 10/972,769

(22) Filed: Oct. 26, 2004

(65) Prior Publication Data

US 2006/0101247 A1    May 11, 2006

(51) Int. Cl.
*G06F 9/302* (2006.01)
*G06F 9/315* (2006.01)

(52) U.S. Cl. ........................... 712/221; 712/223
(58) Field of Classification Search ................. 712/221, 712/222, 223, 224
See application file for complete search history.

(56) References Cited

U.S. PATENT DOCUMENTS

| | | | | |
|---|---|---|---|---|
| 4,377,846 A * | 3/1983 | Yoshida | ...................... | 712/221 |
| 5,177,701 A * | 1/1993 | Iwasa | ........................ | 712/210 |
| 5,301,345 A * | 4/1994 | Skruhak et al. | ............. | 712/223 |
| 6,209,080 B1 * | 3/2001 | Heishi et al. | ............... | 712/212 |
| 6,834,336 B1 * | 12/2004 | Takayama et al. | ............ | 712/24 |
| 6,922,773 B1 * | 7/2005 | Faraboschi et al. | ......... | 712/221 |
| 2005/0125637 A1 * | 6/2005 | Dijkstra et al. | ............. | 712/221 |

* cited by examiner

*Primary Examiner*—William M. Treat
(74) *Attorney, Agent, or Firm*—Nixon & Vanderhye P.C.

(57) ABSTRACT

A data processing apparatus and method for generating constant values is provided. The data processing apparatus comprises a data processing unit operable in response to an instruction to perform a data processing operation on one or more data values. Shift logic is operable to selectively apply a shift operation to data to produce one of the data values for the data processing operation. Further, a plurality of registers are provided for storing data. The instruction has a register specifier field for identifying a register and a shift specifier field for specifying a shift to be applied to that register's data in order to produce one of the data values for the data processing operation. The register specifier field is allocatable a distinguished value, and if the register specifier field has that distinguished value, the shift logic is provided with a predetermined value and generates therefrom one of a plurality of constant values dependent on the shift specified by the shift specifier field, the generated constant value then being used as one of the data values for the data processing operation.

22 Claims, 6 Drawing Sheets

SHIFT TYPE (2 bits)

00 ≡ LOGICAL SHIFT LEFT

01 ≡ LOGICAL SHIFT RIGHT

10 ≡ ARITHMETIC SHIFT RIGHT

11 ≡ ROTATE RIGHT

| OPCODE | Rn | Rd | SHIFT IMMED | SHIFT TYPE | Rm |
|---|---|---|---|---|---|
| 410 | 420 | 430 | 440 | 450 | 460 |

400

SHIFT TYPE (2 bits)

00 = LOGICAL SHIFT LEFT
01 = LOGICAL SHIFT RIGHT
10 = ARITHMETIC SHIFT RIGHT
11 = ROTATE RIGHT

FIG. 5

APPARATUS AND METHOD FOR GENERATING CONSTANT VALUES

BACKGROUND OF THE INVENTION

1. Field of the Invention

The present invention relates to an apparatus and method for generating constant values.

2. Description of the Prior Art

When performing a data processing operation within a data processing apparatus, it is often the case that a constant value is required as one of the input data values for that data processing operation. One known way to provide such a constant value is to encode within a particular instruction an immediate value which can be used to produce that constant value. For example, a move instruction may have encoded therein an immediate value, and execution of the move instruction will cause the immediate value to be expanded as required to the register size of registers within a register file, and then stored within a particular register identified by the move instruction.

As a particular example, in situations where a 32-bit instruction set is used, a certain number of bits of the encoding space, for example 8 bits or 12 bits of the 32-bit instruction, may be used to specify an immediate value. If the register into which the constant value specified by that immediate value to be placed is a 32-bit register, then the immediate value can be zero extended (in the example of an unsigned constant value) or sign extended (in the example of a signed constant value) to 32-bits and then stored within the specified register.

As a further enhancement to the above approach, ARM Limited have provided in their instruction set, an instruction encoding which allows an 8 bit immediate value to be specified, and then a further 4 bits to be specified to identify a rotation to be applied to the immediate value in order to specify its location within a register (with the remaining bits of the register being filled with a predetermined sequence of ones or zeros).

Hence, from the above discussion, it can be seen that there are a number of ways of using an immediate value specified within an instruction to generate particular constant values. However, since there are only a limited number of bits available for specifying an immediate value from which the constant value is to be determined, it will be appreciated that the number of constant values that can be obtained using the above techniques is limited. It would hence be desirable to provide an improved technique for generating constant values for use within the data processing apparatus.

Instructions typically include register specifier fields for identifying source and destination registers for the instruction, a source register holding a source data value for the instruction, and a destination register being a register into which is stored the result data value produced by performing the associated data processing operation. It is also known for an instruction to include a shift specifier field for specifying a shift to be applied to the data identified by a particular one of the register specifier fields, such that the actual input data value is generated by reading the specified register and applying the specified shift to the value read from that register.

In some instruction set architectures, there is also the concept of a "zero register" i.e. a particular value for a register specifier field that, when used in at least some register specifier positions within at least some instructions, causes a value of zero to be read from the register file.

SUMMARY OF THE INVENTION

Viewed from a first aspect the present invention provides a data processing apparatus comprising: a data processing unit operable in response to an instruction to perform a data processing operation on one or more data values; shift logic operable to selectively apply a shift operation to data to produce one of said one or more data values for said data processing operation; a plurality of registers for storing data; the instruction having a register specifier field for identifying a register and a shift specifier field for specifying a shift to be applied to that register's data in order to produce one of said one or more data values for the data processing operation; the register specifier field being allocated a distinguished value, if the register specifier field has that distinguished value, the shift logic being provided with a predetermined value and being operable to generate one of a plurality of constant values dependent on the shift specified by the shift specifier field, the generated constant value being used as one of said one or more data values for the data processing operation.

In accordance with the present invention, the data processing unit is operable in response to an instruction to perform a data processing operation on one or more data values. The instruction has a register specifier field for identifying a register and a shift specifier field for specifying a shift to be applied to that register's data in order to produce one of the data values for the data processing operation. To enable one of a plurality of constant values to be specified as one of the input data values, the register specifier field can be allocated a distinguished value, such that if the register specifier field has that distinguished value, the shift logic receives a predetermined value and is operable to generate the required constant value by performing a shift of that predetermined value as specified by the shift specifier field. This provides a very flexible technique for generating constant values required when executing an instruction, where that constant value can be generated "on the fly" by triggering the supply of a predetermined value to the shift logic, and specifying a shift to be performed on that predetermined value.

In one particular embodiment, as will be discussed in more detail later, the distinguished value may be that used to identify a zero register. However, the specifying of a zero register in association with a shift specifier field would typically be of no benefit, since shift logic typically has the ability to shift logic zero values in from either end of the data value it receives (or to shift sign bits in from the top in the instance of signed integer values), and accordingly the result of such a shift operation would always result in a final operand value of zero. However, in the above embodiment of the present invention, this encoding redundancy is exploited by enabling the shift logic to produce values other than zero in situations where an instruction specifies a zero register and an associated shift, thereby allowing a variety of useful constant values to be encoded within the instruction.

In one embodiment of the present invention, if the register specifier field has the distinguished value, the predetermined value supplied to the shift logic comprises all ones, and the shift logic is operable to shift in a predetermined bit sequence determined with reference to the shift specifier field.

In one particular embodiment, the register file is arranged in such instances to output an "all ones" data value for input to the shift logic. As a particular example, if the data processing operation is performed on 32-bit data values, this would result in the register file outputting a 32-bit value, where all bits had a logic one value, and the shift logic would then be operable to shift in a predetermined bit sequence determined with reference to the shift specifier field in order to generate the required constant value for the data processing operation.

In one embodiment where the predetermined value supplied to the shift logic comprises all ones, the predetermined bit sequence is all zeros, and the shift specifier field identifies the direction of the shift and the number of bit positions to be shifted.

In one embodiment, the instruction has an additional register specifier field for identifying a register whose data is to be used as a data value for said data processing operation without a shift being applied by the shift logic, and if the additional register specifier field has said distinguished value, the data value provided to the data processing unit comprises all zeros.

Alternatively, in such situations, the data value provided to the data processing unit may comprise a program counter value. Hence, it can be seen that when the distinguished value is specified within the additional register specifier field, then this can be used to specify a zero register, or a program counter value, depending upon the instruction.

In one embodiment, the data processing unit is operable in response to a further instruction to perform a further data processing operation on one or more data values, the further instruction having a register specifier field for identifying a register whose data is to be used as a data value for said further data processing operation without a shift being applied by the shift logic, and if the register specifier field of the further instruction has said distinguished value, the data value provided to the data processing unit for the further data processing operation comprises all zeros. Alternatively, in such situations, the data value provided to the data processing unit for the further data processing operation may comprise a program counter value. Hence, in a similar way to the earlier example of an additional register specifier field, if the distinguished value is used in a register specifier field for a further instruction, this may be used to specify either a zero register or a program counter value, depending upon the instruction.

In one embodiment of the present invention, if the register specifier field has said distinguished value, the predetermined value supplied to the shift logic comprises all zeros, and the shift logic is operable to shift in a predetermined bit sequence determined with reference to the shift specifier field. Hence, in this embodiment the distinguished value specifies a zero register, and hence this shift logic is provided with an input data value comprising all zeros.

In one such embodiment, the predetermined bit sequence is all ones, and the shift specifier field identifies the direction of the shift and the number of bit positions to be shifted.

In one embodiment, the plurality of registers are contained in a register file, and if the register specifier field has said distinguished value, the register file is operable to produce the predetermined value to be supplied to the shift logic. Hence, dependent upon the embodiment, when the distinguished value is allocated to the register specifier field, the register file is operable to produce a predetermined value comprising either all zeros or all ones as an input to the shift logic.

In an alternative embodiment, the data processing apparatus further comprises: selection logic operable, if the register specifier field has said distinguished value, to replace data output from the register file with the predetermined value to be supplied to the shift logic. Hence, in this embodiment, the register file may interpret the distinguished value in one particular way, and hence in a particular example may output a program counter value, but the selection logic is operable to replace that data with the predetermined value to be supplied to the shift logic, for example a value comprising all zeros or a value comprising all ones, dependent upon the embodiment.

Viewed from a second aspect, the present invention provides a method of operating a data processing apparatus to generate constant values, the data processing apparatus having a data processing unit operable in response to an instruction to perform a data processing operation on one or more data values, shift logic operable to selectively apply a shift operation to data to produce one of said one or more data values for said data processing operation, and a plurality of registers for storing data, the instruction having a register specifier field for identifying a register and a shift specifier field for specifying a shift to be applied to that register's data in order to produce one of said one or more data values for the data processing operation, the method comprising the steps of: (a) determining the value of the register specifier field; (b) if the register specifier field has a distinguished value, providing a predetermined value to the shift logic; (c) employing the shift logic to generate from the predetermined value one of a plurality of constant values dependent on the shift specified by the shift specifier field; and (d) using the generated constant value as one of said one or more data values for the data processing operation.

BRIEF DESCRIPTION OF THE DRAWINGS

The present invention will be described further, by way of example only, with reference to preferred embodiments thereof as illustrated in the accompanying drawings, in which:

FIG. 5 is a diagram schematically illustrating the fields provided within an instruction in accordance with one embodiment of the present invention.

DESCRIPTION OF PREFERRED EMBODIMENTS

Figure 1:
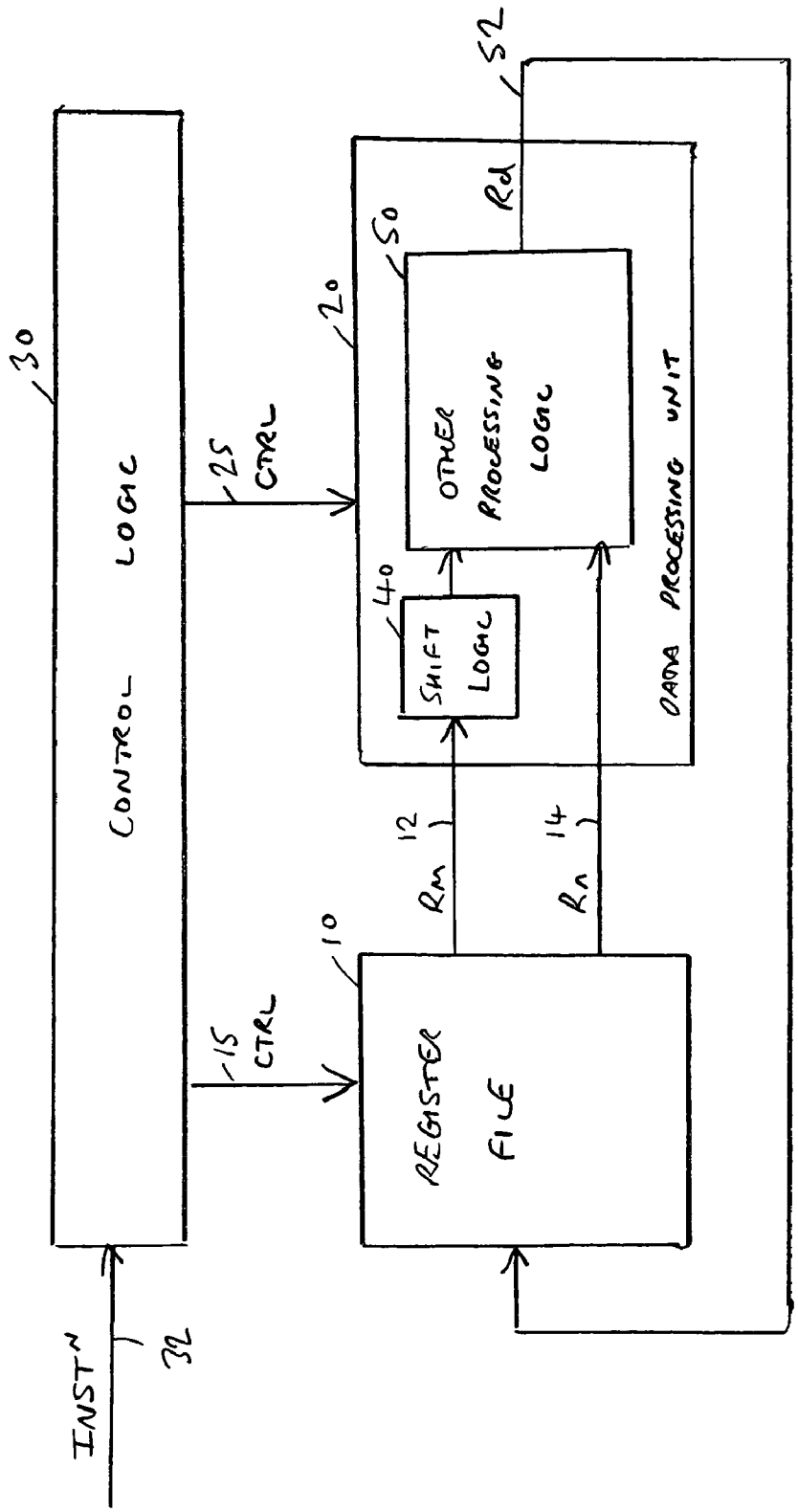
FIG. 1 is a block diagram illustrating a data processing apparatus in which embodiments of the present invention may be performed.

FIG. 1 is a block diagram of a data processing apparatus in which the techniques of embodiments of the present invention may be employed. The data processing apparatus has a data processing unit 20, which may for example be a pipelined processing unit or a non-pipelined processing unit. Within the data processing unit 20, shift logic 40 is provided for selectively performing a shift operation on one of the source operands (also referred to herein as source data values) provided to the data processing unit, prior to that source operand being passed to other processing logic 50 within the data processing unit 20. As can been seen from FIG. 1, in the embodiment illustrated therein, the source operand Rm is routed over path 12 to the shift logic 40 and from there to the other processing logic 50, whilst the other source operand Rn is routed over path 14 to the other processing logic 50 without being routed via the shift logic 40.

As will be appreciated by those skilled in the art, the logic elements provided within the other processing logic 50 may take a variety of forms. As an example, they may include an Arithmetic Logic Unit (ALU) used to perform various arithmetic operations on the input source operands. The data value produced at the output of the processing logic 50 is output from the data processing unit on path 52 from where it can be returned to the register file 10, and indeed in some embodiments may be routed over forwarding paths back into the data processing unit 20.

The register file 10 has a plurality of registers for storing data values required by the data processing unit 20 when performing data processing operations. The registers of the register file can be referenced within register specifier fields of the instructions to be executed on the data processing apparatus, and in particular may be specified as source registers or destination registers. A register used as the destination register in one instruction may be used as a source register in another instruction.

In the example illustrated in FIG. 1, instructions may specify two source registers, Rm and Rn, and one destination register Rd. As will be discussed in more detail, the source register Rm can have associated therewith in the instruction a shift specifier field for specifying a shift to be applied to that register's data in order to produce a data value for input to the processing logic 50 of the data processing unit 20.

As shown in FIG. 1, instructions are input to control logic 30 over path 32, where those instructions are decoded in order to produce control signals for outputting to the register file 10 and the data processing unit 20 over paths 15, 25, respectively. The control signals passed over path 15 will indicate to the register file which registers are to be accessed in order to provide source operands for a data processing operation, and also will identify a destination register into which the result data value produced by the data processing unit is to be stored. The control signals output over path 25 are used to control the operation of the shift logic 40 and the other processing logic 50 in order to cause the appropriate data processing operation to be performed with respect to the source operands received over paths 12 and 14.

Figure 2:
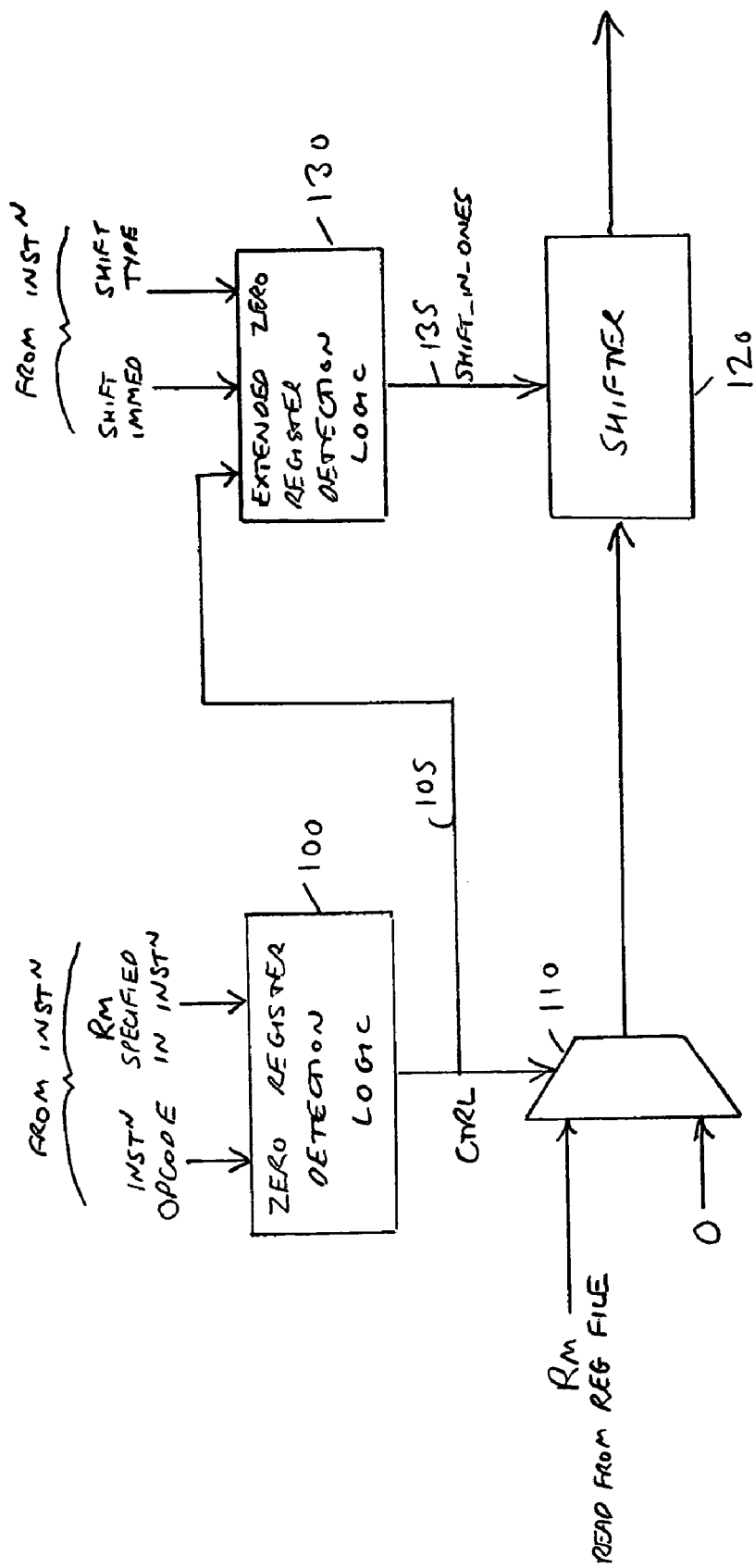
FIG. 2 is a block diagram illustrating certain logic elements provided within the data processing apparatus in accordance with one embodiment of the present invention.

FIG. 2 illustrates logic provided within the data processing unit 20 and within the control logic 30 in accordance with one embodiment of the present invention. Zero register detection logic 100 is provided within the control logic 30 to determine based on the instruction opcode and the value of the source register Rm specified in the instruction whether a zero register is being specified. For example, within a particular instruction set, certain instructions may be arranged such that if the value specified for the source register Rm has a particular distinguished value, then this is to be treated as specifying a zero register, i.e. that the source operand required is all zeros. A multiplexer 110 is provided prior to the shift logic 40 within the data processing unit 20 for receiving as one of its inputs the value read from the register file for the source operand Rm. At its other input, it receives a logic zero value.

The register file is in this instance arranged to determine from the value of Rm specified in the instruction a particular register whose contents are to be output, and then to output the data in that register. If the register specifier Rm has the earlier mentioned distinguished value, this will cause a particular value to be output from the register file, which in one particular embodiment is the program counter value used to identify a current instruction within an instruction sequence. However, if the zero register detection logic 100 in this instance determines from the instruction opcode that the instruction is of a type where the presence of the distinguished value as the register specifier Rm is to be used to indicate the zero register, then it sends a control signal to the multiplexer 110 to cause the multiplexer to output all zeros, rather than the data it receives from the register file.

Hence, in situations where the zero register detection logic 100 detects the presence of a zero register, the shifter logic 120 will be provided with a data value comprising all zeros. Normally, the shifter logic 120 will be arranged to shift logic zero values in from either end of the data value, or to shift sign bits in from the most significant bit of the data value if the input data value is a signed value, the exact shift required being indicated by shift type data and shift immediate data specified within the instruction. In particular, the shift type field will specify whether the shift is a logical left shift or a logical right shift, whether the shift is an arithmetic shift shifting sign bits in from the most significant bit position, or whether some form of rotation shift is to be performed. The shift immediate value specifies the number of bit positions to be shifted.

In accordance with the embodiment of the invention illustrated with reference to FIG. 2, an extended zero register detection logic 130 is provided as part of the shifter control logic, which is arranged to receive the shift immediate and shift type data as decoded from the instruction by the control logic 30, and is also arranged to receive over path 105 the output from the zero register detection logic 100. In situations where the zero register detection logic 100 has detected the presence of the zero register, and accordingly the shifter 120 has been provided with a data value comprising all zeros, then if the extended zero register detection logic detects from the shift immediate value and the shift type value that a non-zero shift is specified, this causes a SHIFT_IN_ONES signal to be output over the path 135 to the shifter 120 to cause the shifter to shift in logic one values rather than logic zero values when performing the shift. Other parts of the shifter control logic will then in a standard manner identify to the shifter 120 the direction of the shift and the number of bit positions to be shifted.

Figure 3:
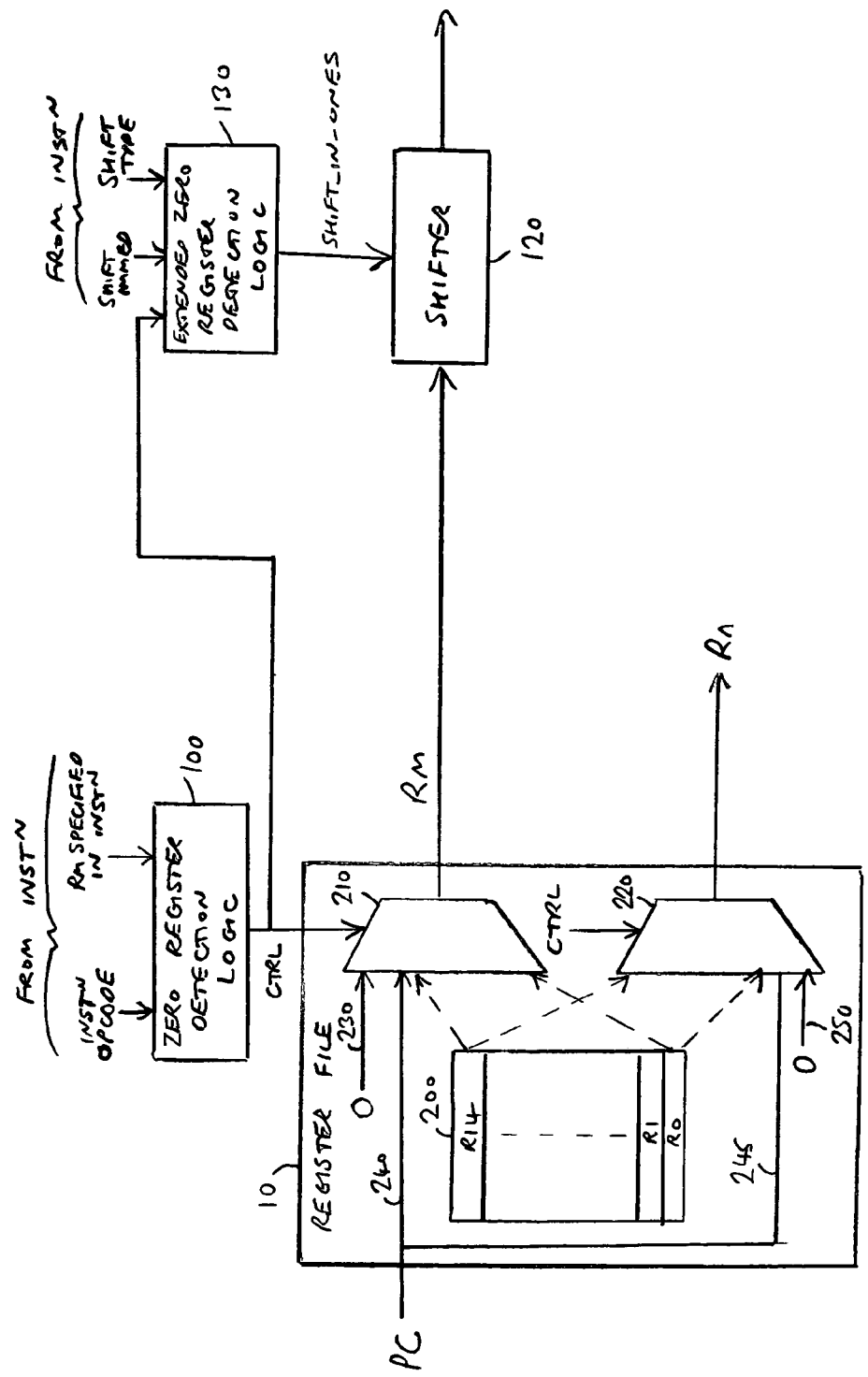
FIG. 3 is a block diagram illustrating certain logic elements provided within the data processing apparatus in accordance with a second embodiment of the present invention.

FIG. 3 illustrates the logic provided in an alternative embodiment of the present invention, where instead of the multiplexer 110, the functionality of that multiplexer is included within the register file 10 itself. As can be seen from FIG. 3, the register file 10 includes a bank of registers 200, and two multiplexers 210, 220 which are operable to receive as their inputs the data stored in each of the registers of the register bank 200. Each multiplexer 210, 220 is also arranged to receive a program counter (PC) value over paths 240, 245 and is further arranged to receive a logic zero value input over paths 230, 250, respectively. In the particular example illustrated in FIG. 3, the registers within the register bank 200 are referred to as registers R0 to R14. A register specifier value of R15 will typically cause the program counter value to be selected.

However, in accordance with this embodiment of the present invention, if the value of the register specifier Rm in the instruction takes the value of R15 in certain instructions (as indicated by the instruction opcode), then this is determined by the zero register detection logic 100 as specifying the zero register, and accordingly a control signal is sent to the multiplexer 210 to cause a logic zero value to be output in that instance rather than the current PC value. Similar control logic to the zero register detection logic 100 is also used to control multiplexer 220, although this logic receives the value of Rn as specified in the instruction rather than the value of Rm. The multiplexer 210 is arranged to output source operand Rm, which is then routed via the shifter 120, whereas the multiplexer 220 is arranged to produce the other source operand Rn which is not routed via the shifter 120. The shifter 120 and extended zero register detection logic 130 act in exactly the same manner as described earlier with reference to FIG. 2.

Figure 4:
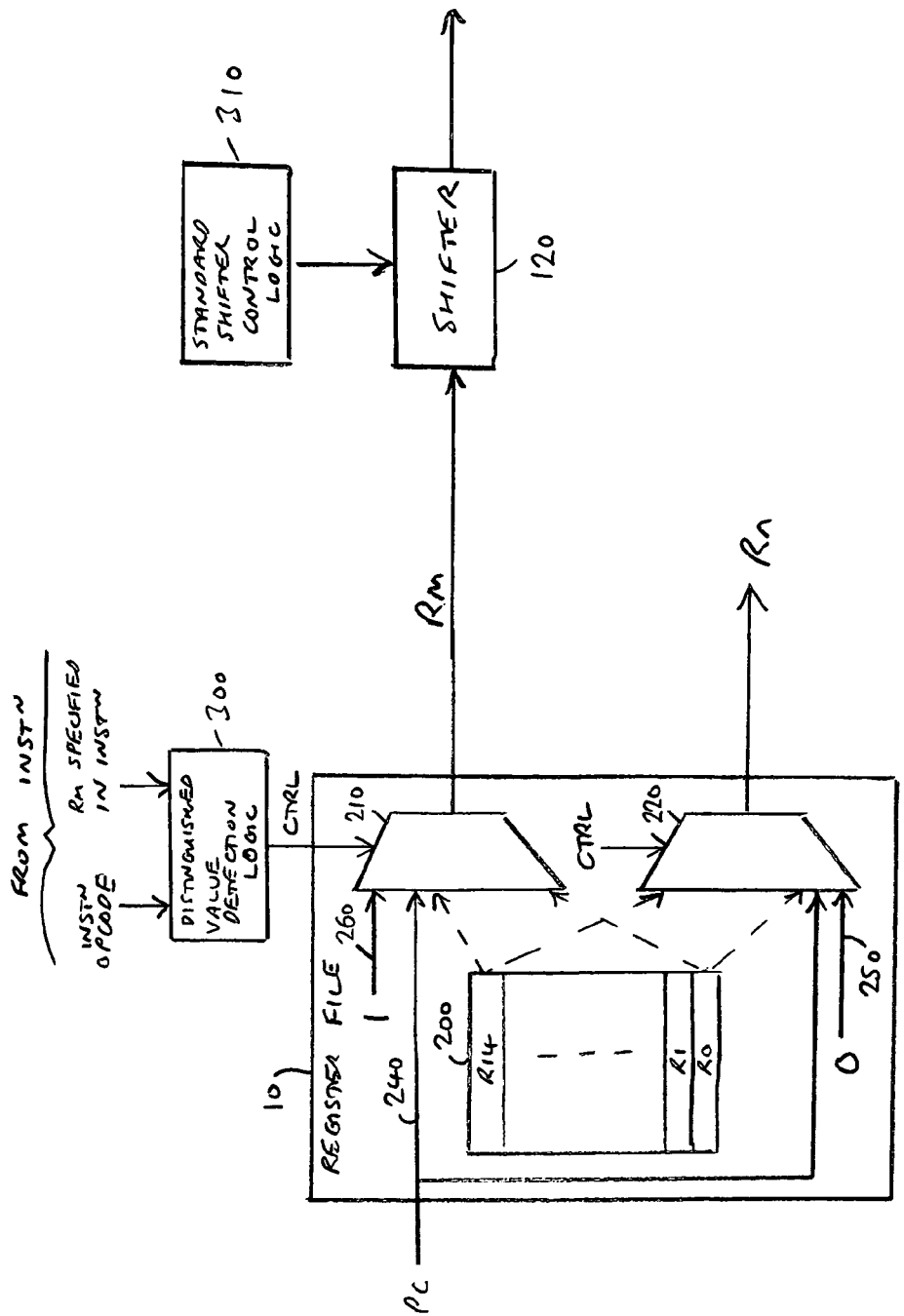
FIG. 4 is a block diagram illustrating certain logic elements provided within the data processing apparatus in accordance with a third embodiment of the present invention.

FIG. 4 illustrates an alternative embodiment of the present invention where the register file is constructed in a similar manner to the register file illustrated in FIG. 3. However, one notable difference is that the multiplexer 210 used to produce the source operand Rm has as one of its inputs a logic 1 value received over path 260 rather than the logic zero value received over path 230 illustrated in FIG. 3.

Distinguished value detection logic 300 is provided to generate a control signal for the multiplexer 210 as with the zero register detection logic 100 of FIG. 3. This logic is arranged to receive the instruction opcode and the register specifier field for Rm as decoded from the instruction. If the register specifier field for Rm has a distinguished value, and the instruction opcode indicates that the instruction is one of a particular number of instructions, then the logic 300 is arranged to general a control signal to the multiplexer 210 to cause the multiplexer to output as the source operand Rm a data value comprising all ones, i.e. it selects as its output the input signal received over path 260. As with the earlier mentioned examples, the distinguished value may be a value indicating R15, which in certain instructions would cause the PC value to be output as the source operand.

The control logic used to control the second multiplexer 220 may be the same as that used in the FIG. 3 embodiment, and accordingly if the value R15 is specified for Rn, this may cause either the PC value or a logic zero value to be output from the multiplexer 220, dependent upon the instruction. Hence, from FIG. 4, it can be seen that the use of the distinguished value as a register specifier within certain instructions can cause a data value comprising all ones to be output from the register file when the distinguished value is used for a shiftable register specifier, or all zeros to be output from the register file when the distinguished value is used for a register specifier that is not shiftable.

Since the presence of the distinguished value in certain instructions causes a source operand Rm comprising all ones to be produced, the shifter logic 120 can operate in a standard manner, i.e. by shifting logic zero values in from the most significant bit position or the least significant bit position of the data value, under the control of standard shifter control logic 310 which determines the appropriate shift to apply based on the shift immediate and shift type data decoded from the instruction.

FIG. 5 is a diagram schematically illustrating the fields provided within an instruction 400 in accordance with one embodiment of the present invention. The opcode field 410 is provided to identify the type of instruction, and hence for example may specify that the instruction is an add instruction, a subtract instruction, etc. Register specifier field 420 identifies the source operand register Rn which is not shiftable, whilst register specifier field 430 identifies the destination register Rd. Field 460 identifies the source operand register Rm, which is shiftable, and the fields 440 and 450 identify the shift immediate value and the shift type value, which as discussed earlier identify the shift to be applied to the data read from the source operand register Rm.

As shown in FIG. 5, the shift type field may in one embodiment comprise two bits, with the meaning of those two bits being set out in FIG. 5. A logical shift will typically comprise a shifting in of logic zero values, except in the specific instances indicated in FIGS. 2 and 3, where the extended zero register detection logic 130 causes the shift operation to change such that it shifts in logic 1 values rather than logic zero values. The arithmetic shift right type of shift is a shift used to shift sign bits in from the most significant bit position of the data value received by the shifter, whilst the rotate right type of shift is used to identify a rotation to be applied to the data value received by the shifter. In one particular embodiment of the present invention, it is envisaged that the use of the distinguished value for the register specifier field Rm, in combination with a shift, in order to cause the shifter to produce a required constant value, will typically only be used with shift types specifying either a logical shift left or a logical shift right. It will be appreciated that in such embodiments shift-type values of "10" or "11" could be reserved for invoking other constant value generation processes.

It should be noted that whilst in FIG. 5 the various fields of the instruction are shown in one particular order, it will be appreciated that these fields do not need to be provided in that particular order within the instruction, nor indeed do the bits making up those fields need to occupy contiguous bit positions within the instruction.

Figure 6:
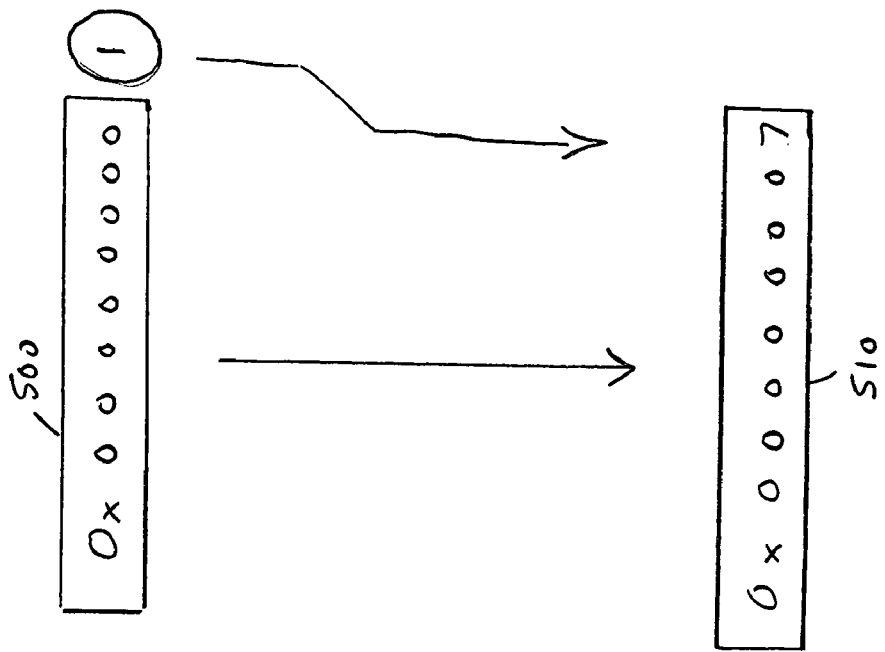
FIG. 6 is a diagram schematically illustrating a shift operation that may be performed by the shift logic in accordance with one embodiment of the present invention.

FIG. 6 is a diagram schematically illustrates an example of a constant value generation that can be performed in accordance with embodiments of the present invention. In this particular instance, it is assumed that the shifter is provided with a zero register input, i.e. the data value 500 comprising all zeros. If the shift type identifies a logical shift left and the shift immediate is set to three, then in this instance the extended zero register detection logic 130 as illustrated in FIGS. 2 or 3 will cause the shifter to shift in logic one values, this causing three "1" bits to be shifted into the data value from the least significant bit position. This produces a data value 510 output from the shifter in which the least significant bits are "0 1 1 1", or "7" in hexadecimal. It will be appreciated that a similar constant value could be produced using the embodiment of FIG. 4, by providing a data value comprising all ones to the shifter and specifying a logical shift right by the required number of bit positions so that logic zero values are inserted from the most significant bit position.

From the above description of embodiments of the present invention, it can be seen that such embodiments take advantage of an encoding redundancy that would otherwise be present in an instruction. In particular, considering the zero register example, if a zero register is specified for a register specifier field with which a shift is associated, this would typically cause a value comprising all zeros to be output from the shifter irrespective of the value of the shift specified. Embodiments of the present invention exploit this by using the multiple combinations of the shift specifier field in combination with the distinguished value identifying the zero register to encode a variety of useful constant values. The alternative embodiment of FIG. 4 produces similar results by ensuring that for a particular distinguished value the shifter is provided with an input data value comprising all ones, thereby ensuring that multiple combinations of the shift specifier field when applied to that all ones input to the shifter can again encode a variety of useful constant values.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
    a data processing unit operable in response to an instruction to perform a data processing operation on one or more data values;
    shift logic operable to selectively apply a shift operation to data to produce one of said one or more data values for said data processing operation;
    a plurality of registers for storing data;
    the instruction having a register specifier field for identifying a register and a shift specifier field for specifying a shift to be applied to that register's data in order to produce one of said one or more data values for the data processing operation;
    the register specifier field being allocatable a distinguished value, if the register specifier field has that distinguished value, the shift logic being provided with a predetermined value and being operable to generate one of a plurality of constant values dependent on the shift specified by the shift specifier field, the generated constant value being used as one of said one or more data values for the data processing operation.

2. A data processing apparatus as claimed in claim 1, wherein if the register specifier field has said distinguished value, the predetermined value supplied to the shift logic comprises all ones, and the shift logic is operable to shift in a predetermined bit sequence determined with reference to the shift specifier field.

3. A data processing apparatus as claimed in claim 2, wherein the predetermined bit sequence is all zeros, and the shift specifier field identifies the direction of the shift and the number of bit positions to be shifted.

4. A data processing apparatus as claimed in claim 1, wherein the instruction has an additional register specifier field for identifying a register whose data is to be used as a data value for said data processing operation without a shift being applied by the shift logic, and if the additional register specifier field has said distinguished value, the data value provided to the data processing unit comprises all zeros.

5. A data processing apparatus as claimed in claim 1, wherein the instruction has an additional register specifier field for identifying a register whose data is to be used as a data value for said data processing operation without a shift being applied by the shift logic, and if the additional register specifier field has said distinguished value, the data value provided to the data processing unit comprises a program counter value.

6. A data processing apparatus as claimed in claim 1, wherein the data processing unit is operable in response to a further instruction to perform a further data processing operation on one or more data values, the further instruction having a register specifier field for identifying a register whose data is to be used as a data value for said further data processing operation without a shift being applied by the shift logic, and if the register specifier field of the furtherer instruction has said distinguished value, the data value provided to the data processing unit for the further data processing operation comprises all zeros.

7. A data processing apparatus as claimed in claim 1, wherein the data processing unit is operable in response to a further instruction to perform a further data processing operation on one or more data values, the further instruction having a register specifier field for identifying a register whose data is to be used as a data value for said further data processing operation without a shift being applied by the shift logic, and if the register specifier field of the further instruction has said distinguished value, the data value provided to the data processing unit for the further data processing operation comprises a program counter value.

8. A data processing apparatus as claimed in claim 1, wherein if the register specifier field has said distinguished value, the predetermined value supplied to the shift logic comprises all zeros, and the shift logic is operable to shift in a predetermined bit sequence determined with reference to the shift specifier field.

9. A data processing apparatus as claimed in claim 8, wherein the predetermined bit sequence is all ones, and the shift specifier field identifies the direction of the shift and the number of bit positions to be shifted.

10. A data processing apparatus as claimed in claim 1, wherein the plurality of registers are contained in a register file, and if the register specifier field has said distinguished value, the register file is operable to produce the predetermined value to be supplied to the shift logic.

11. A data processing apparatus as claimed in claim 1, wherein the plurality of registers are contained in a register file, the data processing apparatus further comprising:
    selection logic operable, if the register specifier field has said distinguished value, to replace data output from the register file with the predetermined value to be supplied to the shift logic.

12. A method of operating a data processing apparatus to generate constant values, the data processing apparatus having a data processing unit operable in response to an instruction to perform a data processing operation on one or more data values, shift logic operable to selectively apply a shift operation to data to produce one of said one or more data values for said data processing operation, and a plurality of registers for storing data, the instruction having a register specifier field for identifying a register and a shift specifier field for specifying a shift to be applied to that register's data in order to produce one of said one or more data values for the data processing operation, the method comprising the steps of:
    (a) determining the value of the register specifier field;
    (b) if the register specifier field has a distinguished value, providing a predetermined value to the shift logic;
    (c) employing the shift logic to generate from the predetermined value one of a plurality of constant values dependent on the shift specified by the shift specifier field; and
    (d) using the generated constant value as one of said one or more data values for the data processing operation.

13. A method as claimed in claim 12, wherein if the register specifier field has said distinguished value, the predetermined value supplied to the shift logic at said step (b) comprises all ones, and at said step (c) the shift logic shifts in a predetermined bit sequence determined with reference to the shift specifier field.

14. A method as claimed in claim 13, wherein the predetermined bit sequence is all zeros, and the shift specifier field identifies the direction of the shift and the number of bit positions to be shifted.

15. A method as claimed in claim 12, wherein the instruction has an additional register specifier field for identifying a register whose data is to be used as a data value for said data processing operation without a shift being applied by the shift logic, and the method further comprises the step of:

if the additional register specifier field has said distinguished value, providing to the data processing unit a data value comprising all zeros.

16. A method as claimed in claim 12, wherein the instruction has an additional register specifier field for identifying a register whose data is to be used as a data value for said data processing operation without a shift being applied by the shift logic, and the method further comprises the step of:

if the additional register specifier field has said distinguished value, providing to the data processing unit a data value comprising a program counter value.

17. A method as claimed in claim 12, wherein the data processing unit is operable in response to a further instruction to perform a further data processing operation on one or more data values, the further instruction having a register specifier field for identifying a register whose data is to be used as a data value for said further data processing operation without a shift being applied by the shift logic, and the method further comprising the step of:

if the register specifier field of the further instruction has said distinguished value, providing to the data processing unit for the further data processing operation a data value comprising all zeros.

18. A method as claimed in claim 12, wherein the data processing unit is operable in response to a further instruction to perform a further data processing operation on one or more data values, the further instruction having a register specifier field for identifying a register whose data is to be used as a data value for said further data processing operation without a shift being applied by the shift logic, and the method furtherer comprising the step of:

if the register specifier field of the further instruction has said distinguished value, providing to the data processing unit for the further data processing operation a data value comprising a program counter value.

19. A method as claimed in claim 12, wherein if the register specifier field has said distinguished value, the predetermined value supplied to the shift logic at said step (b) comprises all zeros, and at said step (c) the shift logic shifts in a predetermined bit sequence determined with reference to the shift specifier field.

20. A method as claimed in claim 19, wherein the predetermined bit sequence is all ones, and the shift specifier field identifies the direction of the shift and the number of bit positions to be shifted.

21. A method as claimed in claim 12, wherein the plurality of registers are contained in a register file, and if the register specifier field has said distinguished value, the register file produces the predetermined value to be supplied to the shift logic.

22. A method as claimed in claim 12, wherein the plurality of registers are contained in a register file, the method further comprising the step of:

if the register specifier field has said distinguished value, replacing data output from the register file with the predetermined value to be supplied to the shift logic.

* * * * *